June 5, 1923.
W. C. LONG ET AL
INSECT EXTERMINATOR
Filed Jan. 24, 1922
1,458,070
3 Sheets-Sheet 1
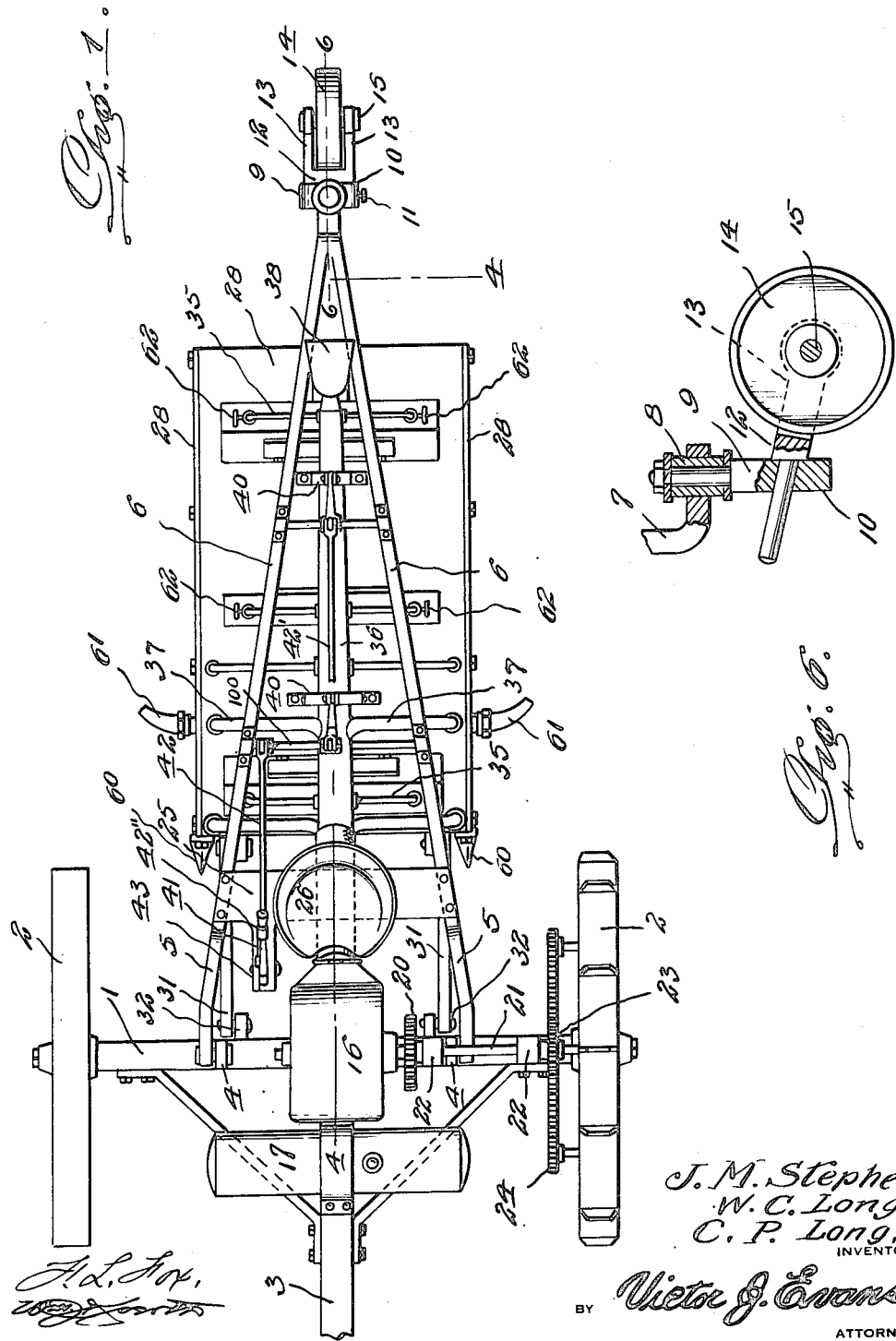
J. M. Stephens,
W. C. Long,
C. P. Long,
INVENTORS
BY Victor J. Evans.
ATTORNEY
WITNESSES:

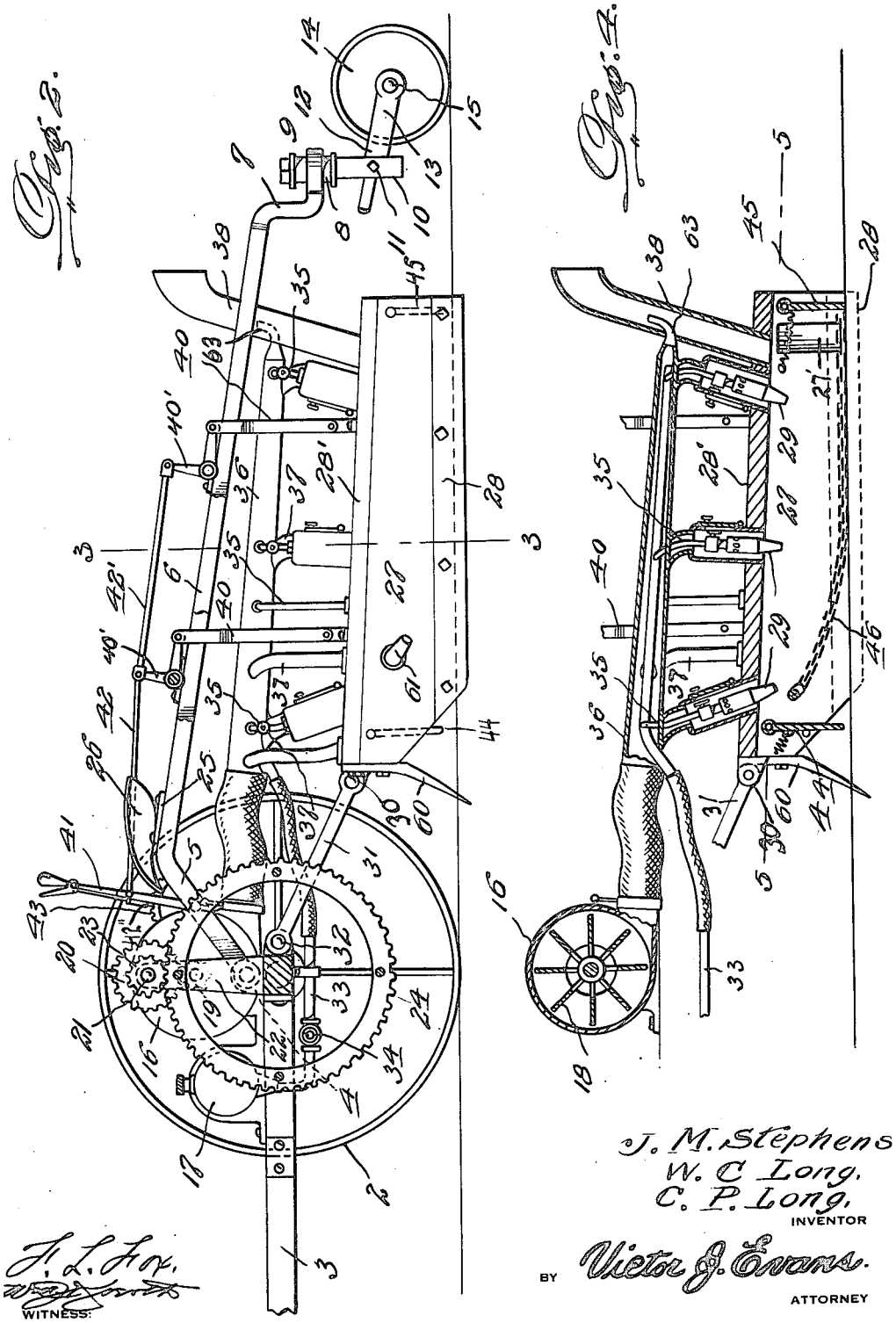

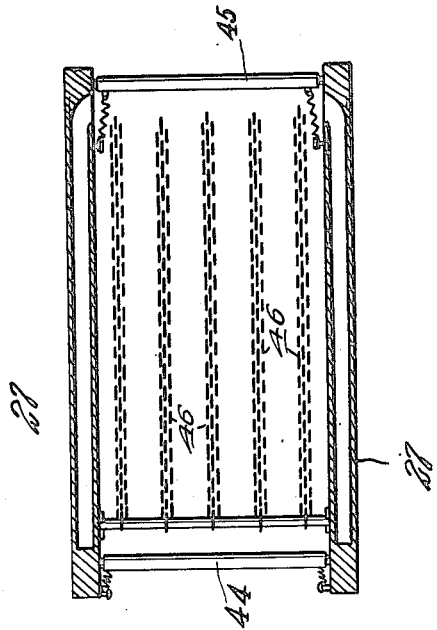
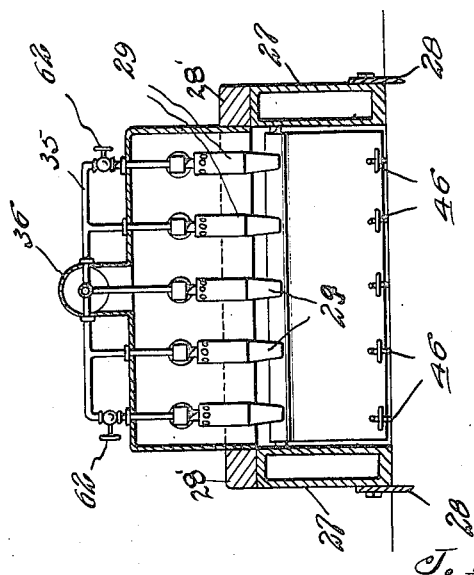

Patented June 5, 1923.

1,458,070

UNITED STATES PATENT OFFICE.

WILLIS C. LONG, CHARLIE P. LONG, AND JOSEPH M. STEPHENS, OF HASTINGS, OKLAHOMA.

INSECT EXTERMINATOR.

Application filed January 24, 1922. Serial No. 531,437.

*To all whom it may concern:*

Be it known that we, WILLIS C. LONG, CHARLIE P. LONG, and JOSEPH M. STEPHENS, citizens of the United States, residing at Hastings, in the county of Jefferson and State of Oklahoma, have invented new and useful Improvements in Insect Exterminators, of which the following is a specification.

My present invention has reference to an insect exterminator.

My object is to produce an insect exterminator that includes a wheeled frame for travel over the cotton fields where squares have fallen to the ground as well as over other fields in which insects are bred and to subject the same to a flame for burning the growth, the flame being confined to prevent the spreading thereof but being extinguished in the passage of the device thereover.

A still further object is to produce an insect exterminator in which a sled-like member is provided with burners to which a suitable fuel is fed, and wherein a draft of air is caused to pass through the device to assist combustion, suitable doors, providing shields being hinged between the runners of the sled at the front and rear thereof so that the flame will be confined to the interior of the sled, and means being further provided between the runners for agitating the growth over which the device travels, so that all particles thereof will be subjected to the flame and all insects as well as their larva in such growth effectively destroyed.

A further object is to produce an insect exterminator in which a sled-like member is employed, said member having at its forward end a rake or agitator for engagement with the growth, said sled having its top provided with burners and the side members or runners thereof being hollow and provided with ports or openings adjacent to the rear ends, means being provided for feeding a fuel to the burners to cause the flame therefrom to be downwardly directed, means being provided for feeding the flame between the runners of the sled, means being further provided for agitating the growth over which the device passes and for exterminating the flame in its passage thereover, while in addition to this means is provided for forcing currents of air through the hollow runners to not only cool the same, but assist the combustion of the fuel, said air finding an outlet through a suitable stack at the rear of the device, while on the sides of the runners there are nozzles through which air is ejected on to the vegetation at the sides of the sled.

The foregoing, and many other objects which will appear as the nature of the invention is better understood, may be accomplished by a construction, combination and operative association of parts, such as is disclosed by the drawings which accompany and which form part of this specification.

In the drawings:—

Figure 1 is a top plan view of an insect exterminator, in accordance with this invention.

Figure 2 is a side elevation thereof.

Figure 3 is a sectional view on the line 3—3 of Figure 2.

Figure 4 is a sectional view on the line 4—4 of Figure 1.

Figure 5 is a sectional view on the line 5—5 of Figure 4.

Figure 6 is a sectional view on the line 6—6 of Figure 1.

As disclosed by the drawings, I make use of a wheeled frame which includes a front axle 1 having wheels 2 journaled on the ends thereof and being provided with a forwardly extending pole 3 to which the draft animals are attached.

Journaled in suitable bearings 4 on the axle 1 are the angle ends of upwardly extending rearwardly inclined rods 5. If desired, the rods may be connected at their said angle ends, and this connecting portion may pass through the bearings 4. The rods, at their upper ends have rearwardly extending inwardly inclined horizontal portions 6 that meet at their ends and are suitably connected. At the ends of the horizontal members 6 of the frame there is a downwardly extending arm 7 having its end offset and provided with a sleeve 8 which is vertically directed and which provides a bearing for a pivot member 9 secured to the outer end of a casting 10. The casting has adjustably connected thereto by means 11 a tongue 12, the said tongue having its outer end enlarged and bifurcated to provide parallel arms 13 which receive therebetween a caster wheel 14, the shaft 15 for the caster wheel finding bearings in the said arms 13.

On the axle 1, between the members 5 of the frame there is secured a fan casing 16 connected at the front of the casing to a liquid fuel reservoir 17. The fan in the casing 16 is indicated by the numeral 18, and has its shafts journaled in suitable bearings in the ends of the casing, one end of the said shaft projecting through one end of the casing and having secured thereon a pinion 19 which is in mesh with a larger pinion 20 having its shaft 21 journaled in suitable bearings 22 supported from the axle 1 and having its outer end provided with a small pinion 23 which is in mesh with a toothed wheel 24 secured to the inner face of one of the wheels 2. It will thus be noted that when the wheels 2 are revolved, the fan 18 will be likewise revolved. Of course, the fan casing has a suitable air inlet opening.

The horizontal inwardly inclined members 6 of the frame, at the forward end of the device are connected by a plate 25, and on this plate the driver's seat 26 is secured.

The flame confining and directing member is, of course, constructed of some suitable material not materially affected by heat, and is in the nature of a sled. The side members or runners of the sled are hollow and are indicated by the numeral 27, each of the same having its lower edge provided with a knife member 28 which extends the entire length of the runners and which is designed to enter the ground and sever the growth between the runners. The top which connects the runners is indicated by the numeral 28', and the same has arranged thereon adjacent to its ends and approximately at its center, transversely arranged burners 29. The forward end of the sled has hingedly connected thereto, as at 30 a substantially U-shaped bail or handle 31, the said bail or handle being also pivotally secured, as at 32 to the axle 1.

Leading from the oil reservoir 17 there is a main conductor pipe 33 whose passage is controlled by a valve 34, and from this pipe there are any desired number of branch pipes 35, which lead to the respective burners 29. Leading from the fan casing there is an air conductor pipe 36. This pipe is provided with branches 37 which communicate with the respective hollow runners 27, the end of the said air pipe 36 communicating with a stack 38 which is arranged in an opening at the rear of the sled. The hollow runners 27 have their inner faces provided with openings or ports 27' which provide air outlets and which are disposed adjacent to the stack, 38.

Secured to the top 28' there are spaced yoke members 40 through which the air conductor pipe 36 passes. Pivotally supported on the frame there are bell crank levers 40'—40' each of which having one of its arms pivotally connected with one of the yokes 40. The second arm of each of the levers 40' are connected together by a link 42'. The bell crank lever 40' nearest the driver's seat has its last mentioned or vertical arm provided with a laterally extending rod 100 to which is pivoted a link 42. The link 42 is pivotally connected to a lever 41, the said lever being pivotally supported on the frame. The lever carries a handle operated spring influenced dog 42" which engages with an arched rack 43 that is also secured on the frame. In this manner it will be noted that by swinging the lever the burner carrying member or sled can be raised or lowered on the frame.

The forward end of the sled is provided with a depending rake or agitator 60 and said forward end of the sled is closed through the medium of a metal plate in the nature of a door 44 which has its upper corners pivotally secured between the runners, a similar door 45 being arranged between the runners at the rear of the sled. The doors or aprons 44 and 45 are spring influenced to closed position but are susceptible to opening by contact with the brush over which they travel. To the rear of the door 44 there is connected to the top 28 of the sled breaker members which are preferably in the nature of chains 46, these chains traveling over the growth between the runners serve to stir up the same so that the flame can more effectively act thereon. On the sides of the hollow runners 27, adjacent to the forward ends thereof there are ports in which are screwed the ends of nozzles 61. The nozzles are connected to their attaching means in a manner whereby the same may be adjusted, so that the outlets thereof may be directed at varying desired angles with respect to the ground. The air forced through these nozzles agitates the growth to the sides of the sled.

As disclosed in Figure 3 of the drawings, there may be provided between certain, preferably the end fuel conducting pipes and the burners therefor, valves 62 which in addition to regulating the passage of the fuel to the burners permits of the same being entirely shut off and also allows the burners to be removed without removing the fuel conducting pipes. The air conducting pipe 36 has its end, which communicates with the stack 38 reduced and preferably provided with an upwardly rounded nozzle end 63, whereby the air will be forcibly ejected through the stack 38. The air passing through the hollow runners not only effects in retaining the same in a cool condition but creates a forced draft for the burners, thus materially aiding combustion.

The chains 46, in addition to agitating the growth, are of a length approximately equalling that of the sled so that the outer links of the chains will tend to smother and extinguish the flames. It is to be noted that the fuel in the fuel tank is under pressure.

It is thought that the foregoing description, when taken in connection with the drawings will fully set forth the construction and advantages of the improvement to those skilled in the art to which such inventions relate and that further detailed description will not be required. It is thought, however necessary to add that the nature of the invention is such as to render the same susceptible to changes and modifications, and therefore it is to be understood that we may, if we desire, in the manufacture of the improvement, make such changes from the construction herein set forth, as fall within the scope of what we claim.

Having described the invention, I claim:—

1. In an insect exterminator, a wheeled frame designed to be drawn over growth containing insects and their larva, flame producing means carried by the frame, means confining the flame to a restricted area for causing the burning of the growth bounded by such area, means for agitating the growth to permit of the free burning thereof, and means for extinguishing the burning growth when the device is passed thereover.

2. In an insect exterminator, a wheeled frame designed to be drawn over growths containing insects and their larva, flame producing means carried by the frame, means confining the flame to a restricted area for igniting the growth bounded by such area, means for agitating the growth to cause the free burning thereof, means for circulating currents of air through the growth to deliver the insects and larva to the flames, and means for extinguishing the burning growth after the passage of the device thereover.

3. In an insect exterminator, a wheeled frame designed to be drawn over growth containing insects and their larva, flame producing means carried by the frame, means confining the flame to a restricted area for causing the burning of the growth bounded by such area, means for agitating the growth to expose the same to the flame, means for creating a forced draft through the flame producing means, and means for extinguishing the burning growth in the passage of the device thereover.

4. In an insect exterminator, a wheeled frame, a burner carrying sled having hollow runners supported from the frame and said runners designed to travel over a growth containing insects and their larva, means directing the flames from the burner to between the runners and on to the growth, means between the runners at the ends thereof for confining the flame between the runners, means for creating a forced draft through the runners, and top of the sled, and means for extinguishing the burning growth during the passage of the device thereover.

5. In an insect exterminator, a wheeled frame designed to pass over growths containing insects and their larva, a burner carrying sled supported from the frame and arranged directly over the growth, the runners of the sled being hollow and having knife edges, means for delivering a fuel to the burners which, when ignited is directed downwardly between the runners of the sled, means for forcibly delivering currents of air through the runners and the top of the sled, means confining the flame between the runners, and means for extinguishing the flame during the passage of the sled over the burning growth.

6. In an insect exterminator, a wheeled frame designed to be drawn over growth containing insects and their larva, a sled-like member supported from the frame and arranged directly over the growth, means for adjusting the sled-like member with respect to the frame, burners carried by the members, means for delivering fuel from the frame to the burners which, when ignited are designed to direct the flame downwardly between the runners, means for forcibly delivering currents of air from the sides of the runners on to the growth and thereafter through the top of the sled, means for confining the flames between the runners, means for extinguishing the flame after the passage of the device over the burning growth, and means for creating a forced draft between the runners and the atmosphere.

7. In an insect exterminator, a wheeled frame designed for movement over a growth containing insects and their larva, a burner carrying sled supported from the frame for travel on the growth, means on the forward end of the sled for agitating the growth, said sled having hollow runners provided with knife edges, a liquid fuel reservoir on the frame, a fan casing having a fan therein on the frame, means actuated by the turning of one of the wheels of the frame for operating the fan, a stack on the sled at the rear thereof, a pipe connection between the stack and fan, pipe connections between the last mentioned pipe and the runners, nozzles on the outer sides of the runners, said runners having their inner sides provided with ports disposed adjacent to the stack, valved pipes between the fuel reservoir and the burners, and spring influenced doors between the runners adjacent to the ends thereof, and chain members secured to the under face of the sled and arranged between the runners.

In testimony whereof we affix our signatures.

WILLIS C. LONG.
CHARLIE P. LONG.
JOSEPH M. STEPHENS.